(12) United States Patent
Lellmann

(10) Patent No.: US 11,535,259 B2
(45) Date of Patent: Dec. 27, 2022

(54) METHOD FOR DETERMINING A FRICTION COEFFICIENT FOR A CONTACT BETWEEN A TIRE OF A VEHICLE AND A ROADWAY, AND METHOD FOR CONTROLLING A VEHICLE FUNCTION OF A VEHICLE

(71) Applicant: Robert Bosch GmbH, Stuttgart (DE)

(72) Inventor: Christian Lellmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/638,229

(22) PCT Filed: Jun. 15, 2018

(86) PCT No.: PCT/EP2018/066009
§ 371 (c)(1),
(2) Date: Mar. 30, 2020

(87) PCT Pub. No.: WO2019/029876
PCT Pub. Date: Feb. 14, 2019

(65) Prior Publication Data
US 2020/0307606 A1 Oct. 1, 2020

(30) Foreign Application Priority Data
Aug. 11, 2017 (DE) .......................... 102017214030.5

(51) Int. Cl.
*B60W 40/068* (2012.01)
*B60W 30/00* (2006.01)

(52) U.S. Cl.
CPC .......... *B60W 40/068* (2013.01); *B60W 30/00* (2013.01)

(58) Field of Classification Search
CPC ............... B60W 40/068; B60W 30/00; B60W 2552/40; B60W 2555/80; B60W 40/064;
(Continued)

(56) References Cited

U.S. PATENT DOCUMENTS 10,442,439 B1 * 10/2019 Seo ........................ B60W 40/00
10,773,725 B1 * 9/2020 Ilievski ............... B60W 40/068
(Continued)

FOREIGN PATENT DOCUMENTS

CN 102481924 A * 5/2012 .............. B60L 3/102
DE 102005060219 A1 6/2007
(Continued)

OTHER PUBLICATIONS

CN-102481924-A translation (Year: 2012).*
(Continued)

*Primary Examiner* — Jeff A Burke
*Assistant Examiner* — Kyle T Johnson
(74) *Attorney, Agent, or Firm* — Norton Rose Fulbright US LLP; Gerard Messina

(57) ABSTRACT

A method for determining a friction coefficient for a contact between a tire of a vehicle and a roadway. The method includes processing sensor signals in order to generate processed sensor signals. The sensor signals represent state data that are read in at least by at least one detection device and that are correlatable with the friction coefficient. The processed sensor signals represent at least one preliminary friction coefficient. The method also includes ascertaining the friction coefficient using the processed sensor signals and a regression model.

7 Claims, 3 Drawing Sheets

(58) Field of Classification Search
CPC ............ B60W 40/06; B60W 50/0097; B60W 30/18172; B60W 2520/26; B60T 2210/12; B60L 2240/465; G01N 19/02
See application file for complete search history.

(56) References Cited

U.S. PATENT DOCUMENTS

| | | | | |
|---|---|---|---|---|
| 2001/0029419 | A1* | 10/2001 | Matsumoto | B60T 8/172 701/80 |
| 2001/0029420 | A1* | 10/2001 | Kawasaki | B60T 8/172 701/80 |
| 2001/0044688 | A1* | 11/2001 | Okita | B60W 50/029 701/92 |
| 2002/0198632 | A1* | 12/2002 | Breed | G08G 1/164 701/1 |
| 2008/0243348 | A1* | 10/2008 | Svendenius | B60T 8/172 701/90 |
| 2011/0264300 | A1* | 10/2011 | Tuononen | G01M 17/02 701/1 |
| 2013/0211741 | A1* | 8/2013 | Tebano | G01N 19/02 702/42 |
| 2015/0224925 | A1* | 8/2015 | Hartmann | G06K 9/00791 348/148 |
| 2017/0225688 | A1* | 8/2017 | Milanese | B60W 40/068 |
| 2018/0106714 | A1* | 4/2018 | Skold | B60T 8/1764 |
| 2020/0307606 | A1* | 10/2020 | Lellmann | B60W 30/00 |
| 2020/0406897 | A1* | 12/2020 | Hartmann | G06K 9/6293 |
| 2020/0406925 | A1* | 12/2020 | Du | B60T 8/175 |

FOREIGN PATENT DOCUMENTS

| | | | |
|---|---|---|---|
| DE | 102012112725 A1 | 6/2014 | |
| EP | 3695700 A1 * | 8/2020 | ........... A01D 34/008 |

OTHER PUBLICATIONS

International Search Report for PCT/EP2018/066009, dated Aug. 23, 2018.
Andreas Andersson, "Road-Tire Friction for AFS Vehicle Control," Aug. 1, 2006, 42 pages, retrieved from the internet: http://lup.lub.lu.se/student-papers/record/8847828.
Kwon and Gu: Modelling of Winter Road Surface temperature (RST)—A-GIS-Based Approach, 2017 Int'l Conf. on transportation Information and Safety (ICTIS) (2017), pp. 551-556.
Schmitt, et al.: "Technical Report TR-2008-03. A Gaussian Process-Based Approach for Handling Uncertainty in Vehicle Dynamics Simulation", (2008), pp. 1-22.

* cited by examiner

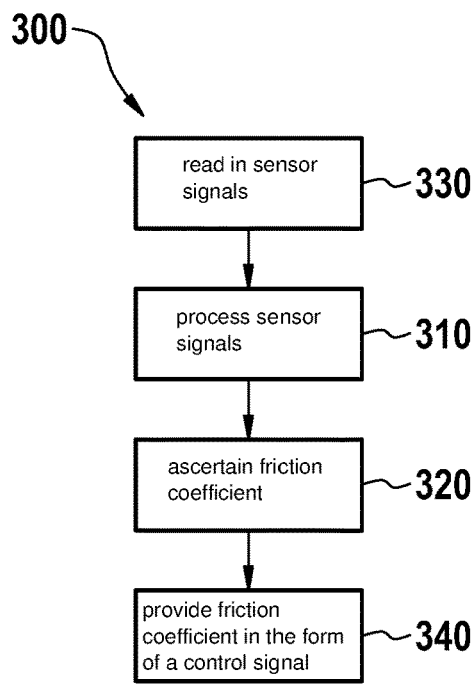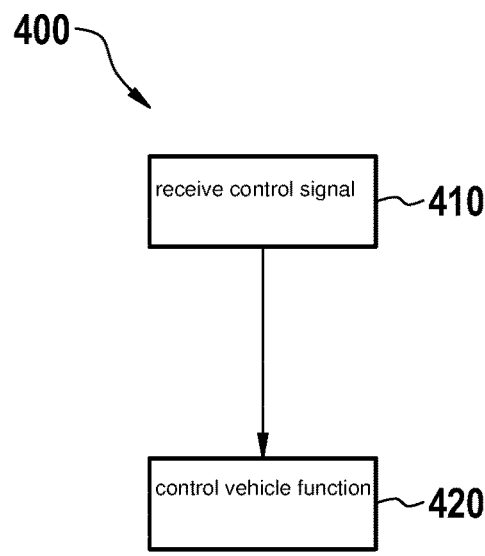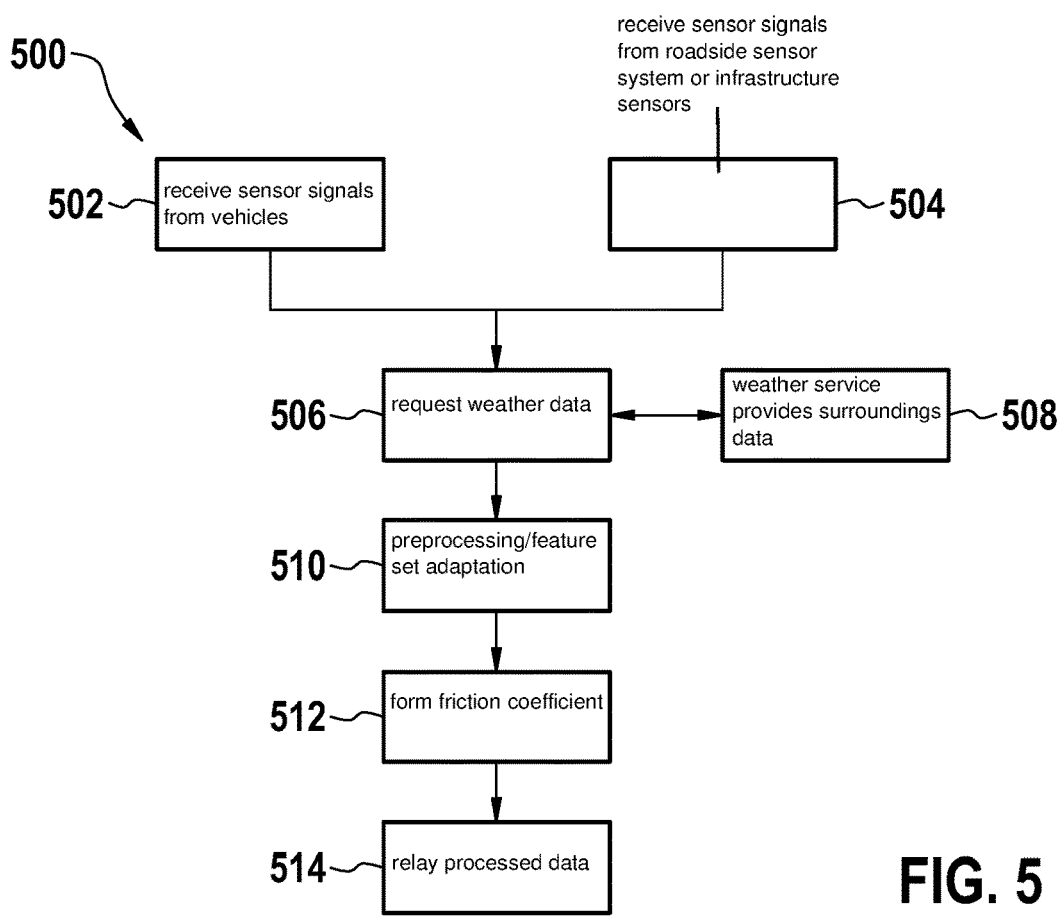

METHOD FOR DETERMINING A FRICTION COEFFICIENT FOR A CONTACT BETWEEN A TIRE OF A VEHICLE AND A ROADWAY, AND METHOD FOR CONTROLLING A VEHICLE FUNCTION OF A VEHICLE

FIELD

The present invention is directed to a device and a method for determining a friction coefficient between a tire of a vehicle and a roadway. Moreover, the present invention relates to a computer program.

BACKGROUND INFORMATION

The friction coefficient between a vehicle and a roadway, among other things, may be important for vehicle movements. For a direct active friction coefficient measurement in particular situations, such as a runway friction coefficient determination, measuring vehicles that include friction coefficient measuring technology may be used.

German Patent Application No. DE 10 2005 060 219 A1 describes an estimation of a friction coefficient between a road and tires of a motor vehicle.

SUMMARY

In accordance with the present invention, a method, a device that uses this method, and a corresponding computer program are provided. Advantageous refinements on and enhancements of the method and device are described herein.

According to specific embodiments of the present invention, a friction coefficient between a roadway and a vehicle may be determined in particular via a time sequence-based statistical approach. The friction coefficient may be determined as an estimated value or a probability distribution of friction coefficients, using sensor data or sensor signals, for example. For this purpose, sensor signals may be processed in particular using a regression model or regression algorithm. The friction coefficient may be used for controlling a vehicle function of a vehicle, in particular an assistance function. In particular, cloud-based friction coefficient estimation and prediction may be achieved using a regression model, in particular a linear regression algorithm.

According to specific embodiments of the present invention, in particular an accurate and reliable estimation of friction between a vehicle and a roadway may advantageously be made possible. For example, data from a plurality of sources may be used, and swarm knowledge may thus be utilized. Thus, in particular effects of possible sensor errors may also be reduced, and results of statistical analysis for the friction coefficient determination may be improved. In addition, for example a large user group may be addressed. Furthermore, setup effort for utilizing the friction coefficient determination may be kept low and cost-effective, in particular compared to a dedicated friction coefficient sensor system. The friction coefficient determination may optionally be combined with other connectivity functions. In particular, the friction coefficient determination may provide results about road sections, even for vehicles that have not yet traveled such road sections themselves.

An example method for determining a friction coefficient for a contact between a tire of a vehicle and a roadway is provided according to the present invention, the example method including the following steps:

processing sensor signals in order to generate processed sensor signals, the sensor signals representing state data that are read in at least by at least one detection device and that are correlatable with the friction coefficient,
the processed sensor signals representing at least one preliminary friction coefficient; and
ascertaining the friction coefficient using the processed sensor signals and a regression model.

The example method may be implemented, for example, in software or hardware or in a mixed form of software and hardware, for example in a device or a control unit. The friction coefficient may be determined as an estimated value, and additionally or alternatively as a probability distribution of a friction at a certain location or region of the roadway for a point in time. The friction coefficient and the preliminary friction coefficient may also each represent a value range, it being possible, for example, for the friction coefficient and the preliminary friction coefficient to each represent an average value and a confidence interval or the like. The friction coefficient may be determined for the use for a control of a vehicle function of a vehicle, in particular an assistance function or an assistance system of a vehicle. The state data may represent physical measured values that are obtained by the at least one detection device. The method may also include a step of reading in the sensor signals from an interface to the at least one detection device. In addition, the method may include a step of providing the friction coefficient in the form of a control signal for outputting to an interface to at least one vehicle. The regression model may be designed to carry out a linear regression on the at least one preliminary friction coefficient. Furthermore, the regression model may include a regression algorithm, and additionally or alternatively at least one linear polynomial. The friction coefficient may also be referred to as a result friction coefficient. The sensor signals may represent state data that are read in at different points in time. Additionally or alternatively, the sensor signals may represent state data concerning a surrounding area that includes the roadway.

According to one specific embodiment, in the step of ascertaining, multiple preliminary friction coefficients, in each case for one point in time, may be aggregated to form the friction coefficient as a function of confidence intervals of the multiple preliminary friction coefficients, and additionally or alternatively using weighted average values. Such a specific embodiment offers the advantage that a reliable and accurate friction coefficient may be determined, taking into account, for example, preliminary friction coefficients that are computed in various ways.

In addition, in the step of ascertaining, the regression model may be changed as a function of instantaneous, and additionally or alternatively previous, preliminary friction coefficients, and additionally or alternatively using the least squares method, in particular with possible weighting of the data. Such a specific embodiment offers the advantage that updating the regression model according to the situation is made possible in order to allow a reliable and accurate response to changing conditions. In addition, a prediction of the friction coefficient by extrapolation is possible, since the regression model represents a time curve of the ascertained preliminary friction coefficients.

Moreover, a plurality of regression models may be used in the step of ascertaining. A dedicated regression model of the plurality of regression models may be used for each of a plurality of geographical regions. Each geographical region may include a subsection of the roadway, based on a longitudinal extent of the roadway. Such a specific embodiment offers the advantage that regional differences in geography may be taken into account to allow the friction coefficient to be reliably and exactly determined.

Furthermore, the friction coefficient may be ascertained for a geographical region that includes the surrounding area, in the step of ascertaining. In the step of ascertaining, the friction coefficient may be ascertained for at least one further geographical region neighboring the geographical region, using at least one friction coefficient. Each geographical region may include a subsection of the roadway, based on a longitudinal extent of the roadway. Each sensor signal may be associated with a geographical region in the step of processing. Such a specific embodiment offers the advantage that a friction coefficient map or the like may also be generated, using friction coefficients that are reliably and accurately ascertained regionally.

According to one specific embodiment, in the step of processing, sensor signals may be processed that represent state data read in by a surroundings sensor of at least one vehicle, an infrastructure sensor for the surrounding area, and additionally or alternatively at least one driving data sensor of the vehicle. Additionally or alternatively, in the step of processing, sensor signals may be processed that represent the surroundings data for the surrounding area, infrastructure data for the surrounding area, and additionally or alternatively driving data of the vehicle. The surroundings data may represent measured values of at least one surroundings sensor, such as weather data, in particular temperature, rain, snow, humidity, air pressure, solar radiation etc., and additionally or alternatively surroundings data from a vehicle-internal surroundings sensor system such as a camera, radar, thermal imaging, LIDAR, etc. The infrastructure data may represent measured values from at least one infrastructure sensor, in particular data detected with the aid of a road sensor system, for example a temperature of a road pavement, dampness on a road surface, a number of vehicles, etc. The driving data may represent measured values from at least one vehicle data sensor, for example an inertial sensor system, odometry, slip detection, a sensor system of a steering system and, additionally or alternatively, of an assistance system of at least one vehicle, etc. Such a specific embodiment offers the advantage that numerous options for obtaining state data may be utilized.

Moreover, an example method for controlling a vehicle function of a vehicle is provided in accordance with the present invention, the example method including the following steps:

receiving a control signal that is generated using a friction coefficient that is determined according to one specific embodiment of the above-mentioned method; and controlling the vehicle function using the received control signal.

This example method may be implemented, for example, in software or hardware or in a mixed form of software and hardware, for example in a device or a control unit. The vehicle function may represent an assistance function of an assistance system of the vehicle. The vehicle may be a vehicle for highly automated driving.

The present invention also provides an example device that is designed to carry out, control, or implement the steps of one variant of a method presented here in appropriate devices. In addition, the object underlying the present invention may also be quickly and efficiently achieved via this embodiment variant of the present invention in the form of a device.

For this purpose, the example device may include at least one processing unit for processing signals or data, at least one memory unit for storing signals or data, at least one interface to a sensor or an actuator for reading in sensor signals from the sensor or for outputting data and control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a hard-wired manner; a communication interface which may read in or output the line-bound data may read in these data electrically or optically, for example, from an appropriate data transmission line, or output same to an appropriate data transmission line.

In the present context, a device may be understood to mean an electrical device that processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules which are present on a microcontroller, for example, in addition to other software modules.

Also advantageous is a computer program product or a computer program including program code which may be stored on a machine-readable medium or memory medium such as a semiconductor memory, a hard disk, or an optical memory, and used for carrying out, implementing, and/or controlling the steps of the method according to one of the specific embodiments of the present invention described herein, in particular when the program product or program is executed on a computer or a device.

Exemplary embodiments present invention are illustrated in the figures and explained in greater detail below.

BRIEF DESCRIPTION OF THE DRAWINGS

FIG. 3 shows a flow chart of a method for determining according to one exemplary embodiment.

FIG. 4 shows a flow chart of a method for controlling according to one exemplary embodiment.

FIG. 5 shows a flow chart of a determination process according to one exemplary embodiment.

DETAILED DESCRIPTION OF EXAMPLE EMBODIMENTS

Figure 1:
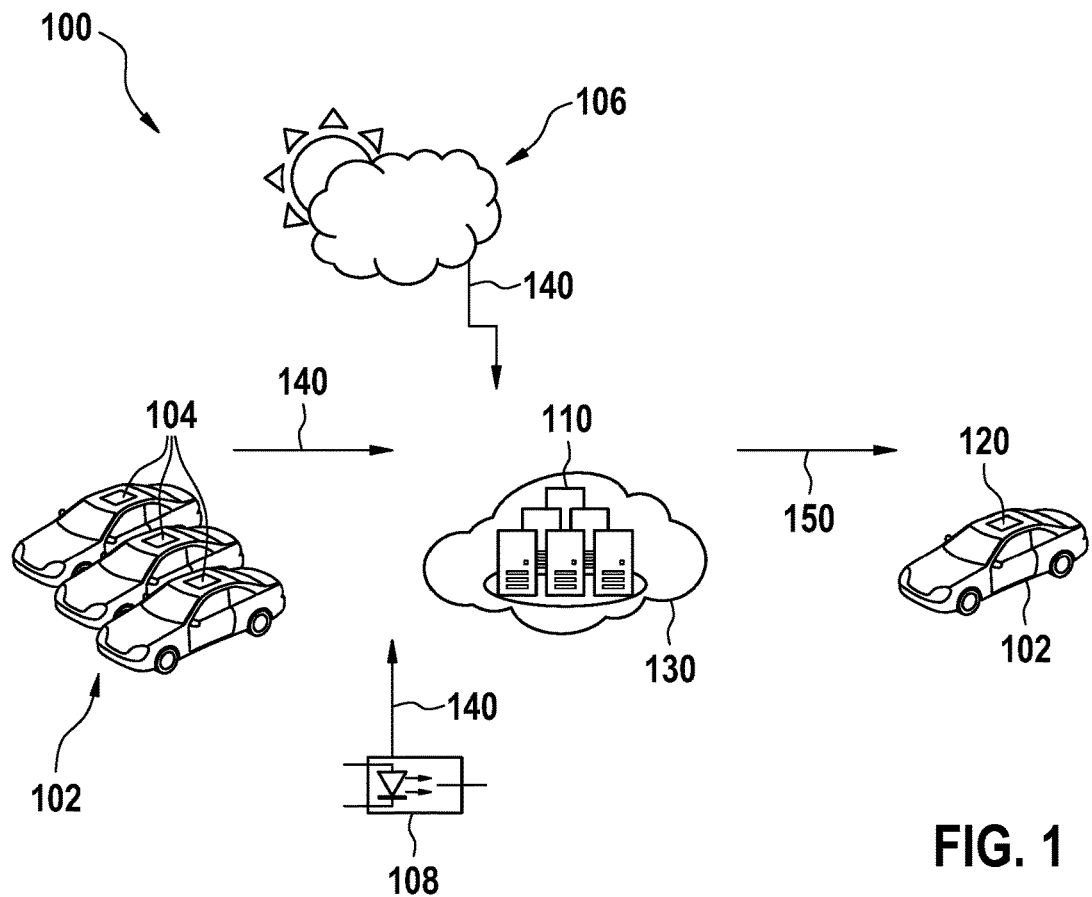
FIG. 1 shows a schematic illustration of a networked system according to one exemplary embodiment.

Before exemplary embodiments of the present invention are described in greater detail below with reference to the figures, a brief explanation of the background and fundamentals of the exemplary embodiments is initially provided.

Developments in the field of networked vehicles allow an exchange of sensor system data regarding the instantaneous roadway, speed, traffic situation, etc., with the aid of so-called connectivity units, for example. Due to processing of such data and the resulting information gained concerning road sections, for example highly automated driving and predictive driving assistance systems may be operated with a gain in safety. In particular, a vehicle may be provided with information concerning the surroundings which could not be generated by the vehicle itself with its own sensor system.

In this context, the friction coefficient of a contact between a road or roadway and a vehicle is also important. Dedicated friction coefficient sensors are generally not installed in passenger vehicles and the like. According to specific embodiments it is possible to determine or estimate a friction coefficient for road sections, in particular via server-side processing of a large quantity of sensor data from many different vehicles, for example an acceleration sensor system in combination with a weather sensor system and a roadside sensor system, for example, smoothness sensors. Such information concerning the friction coefficient may then be used for further function development with the aim of increasing safety and comfort. Road friction coefficients that are entered into a friction coefficient map may be utilized, for example, to set vehicle speeds, for example prior to curves, in an automated manner. Hazardous situations or accidents due to leaving the lane, in particular in difficult road conditions such as wetness or snow, may thus be avoided.

For a direct active friction coefficient measurement in particular situations, for example a runway friction coefficient determination, there are measuring vehicles that include friction coefficient measuring technology. Examples include the so-called surface friction tester and the so-called sideway force coefficient routine investigation machine. Both are based on a force measurement. The surface friction tester is a vehicle trailer with three wheels. The third wheel is decelerated to the physical limit until the tires come to a standstill. The friction force may be determined via the required brake force or the required braking torque, and the friction coefficient may be determined with the aid of the known normal force. The sideway force coefficient routine investigation machine determines the friction force via the lateral force of a fifth wheel that is inclined by 20 degrees with respect to the travel direction. The friction coefficient may once again be determined using the known normal force.

In the description below of advantageous exemplary embodiments of the present invention, identical or similar reference numerals are used for the functionally equivalent elements illustrated in the various figures, and a repeated description of these elements is dispensed with.

FIG. 1 shows a schematic illustration of a networked system 100 according to one exemplary embodiment. System 100 is designed to determine a friction coefficient for road traffic and make it usable. For this purpose, system 100 at least includes a first device 110 and a second device 120. Also belonging to and/or associated with system 100 are, strictly by way of example, four vehicles 102, vehicle sensors 104 in the form of driving data sensors and/or surroundings sensors onboard the vehicle, a surroundings sensor 106 strictly by way of example, an infrastructure sensor 108 strictly by way of example, and a server device 130, a so-called server backend 130, a data cloud 130 or a so-called cloud 130. Signal transmission-capable networking within system 100 may be implemented, for example, via radio or some other type of data transmission.

First device 110 is implemented as part of server device 130. For illustration reasons in FIG. 1, second device 120 is situated strictly by way of example in one of vehicles 102, which may be referred to here as a receiver vehicle 102. Driving data sensors 104 are situated strictly by way of example in three of vehicles 102, which may be referred to here as transmitter vehicles 102. In addition, receiver vehicle 102 may include a vehicle sensor 104. In addition, transmitter vehicles 102 may each include a second device 120.

First device 110 is designed to determine a friction coefficient for a contact between a tire of a vehicle 102 and a roadway. First device 110 is designed to read in sensor signals 140 from vehicle sensors 104, surroundings sensor 106, and infrastructure sensor 108. Sensor signals 140 represent state data or physical measured values, for example surroundings data for a surrounding area from surroundings sensor 106, infrastructure data for the surrounding area from infrastructure sensor 108, and/or driving data and/or surroundings data of vehicles 102 from vehicle sensors 104. In addition, first device 110 is designed to determine the friction coefficient, using sensor signals 140, and to provide or output a control signal 150 that represents or includes the friction coefficient. Second device 120 is designed to control a vehicle function of vehicle 102, in the present case receiver vehicle 102, using control signal 150.

System 100 is designed in such a way that many vehicles 102 transmit, for example via a mobile radio communications network, sensor signals 140 or sensor data to server backend 130 or first device 110 that is implemented in same. In addition, there are infrastructure data, for example road sensor system data, and surroundings data, for example weather data, that may be queried. With the aid of first device 110, sensor signals 140 are processed in time sequences according to one exemplary embodiment of a linear regression model that is continually updated with new data, in order to aggregate a location-dependent friction coefficient. This aggregated friction coefficient may be precisely relayed, in the form of control signal 150, to further vehicles 102 in order to provide participating vehicles 102 with information concerning the present friction coefficient in a particular region or a particular surrounding area.

Figure 2:
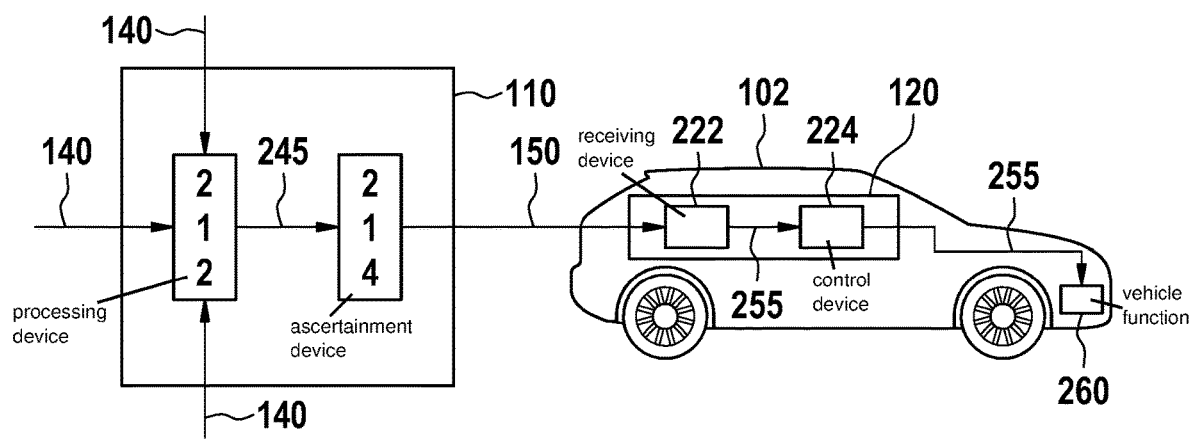
FIG. 2 shows a schematic illustration of portions of the system from FIG. 1.

FIG. 2 shows a schematic illustration of portions of the system from FIG. 1. From the system from FIG. 1, the illustration in FIG. 2 shows by way of example only first device 110, and receiver vehicle 102 that includes second device 120 and vehicle function 260. Vehicle function 260 is, for example, an assistance function of an assistance system of receiver vehicle 102.

First device 110 includes a processing device 212 and an ascertainment device 214. Processing device 212 is designed to process sensor signals 140 in order to generate processed sensor signals 245. Sensor signals 140 represent at least state data that are read in by at least one detection device and are correlatable with the friction coefficient. Processed sensor signals 245 represent at least one preliminary friction coefficient. Ascertainment device 214 is designed to ascertain the friction coefficient, using processed sensor signals 245 and a regression model, in particular for linear regression. First device 110 is designed to output or provide for output the ascertained friction coefficient in the form of control signal 150.

Second device 120 includes a receiving device 222 and a control device 224. Receiving device 222 is designed to receive control signal 150 from first device 110. In addition, receiving device 222 is designed to output or provide a received control signal 255 to control device 224. Control device 224 is designed to relay received control signal 255 to vehicle function 260 in order to control vehicle function 260 using received control signal 255.

Alternatively, vehicle function 260 may be directly controllable using control signal 150. First device 110 may be designed to provide or output a suitable control signal 150 for vehicle function 260. The second device may be omitted.

FIG. 3 shows a flow chart of a method 300 for determining according to one exemplary embodiment. Method 300 may be carried out to determine a friction coefficient for a contact between a tire of a vehicle and a roadway. Method 300 may for determining be carried out in conjunction with the system from FIG. 1 or FIG. 2. In addition, method 300 may be carried out for determining, using or with the aid of the first device from FIG. 1 or FIG. 2.

In method 300 for determining, sensor signals are processed in a step 310 of the processing in order to generate processed sensor signals. The sensor signals represent state data that are read in at least by at least one detection device and that are correlatable with the friction coefficient. The processed sensor signals represent at least one preliminary friction coefficient. The friction coefficient is subsequently ascertained in a step 320 of ascertaining, using the processed sensor signals and a regression model.

According to one exemplary embodiment, multiple preliminary friction coefficients, in each case for one point in time, are aggregated to form the friction coefficient as a function of confidence intervals of the multiple preliminary friction coefficients, and/or using weighted average values, in step 320 of ascertaining. According to another exemplary embodiment, the regression model is changed as a function of instantaneous and/or previous preliminary friction coefficients, and/or using the least squares method, in step 320 of ascertaining. Additionally or alternatively, according to one exemplary embodiment a plurality of regression models is used in step 310 of processing. A dedicated regression model of the plurality of regression models is used for each of a plurality of geographical regions.

According to one exemplary embodiment, in step 320 of ascertaining, the friction coefficient is ascertained for a geographical region that includes the surrounding area. In addition, the friction coefficient is ascertained for at least one further geographical region neighboring the geographical region, using at least one already ascertained friction coefficient, in step 320 of ascertaining.

According to one exemplary embodiment, method 300 for determining also includes a step 330 of reading in the sensor signals from an interface to the at least one detection device. In addition, method 300 for determining optionally includes a step 340 of providing the friction coefficient in the form of a control signal for outputting to an interface to at least one vehicle.

FIG. 4 shows a flow chart of a method 400 for controlling according to one exemplary embodiment. Method 400 may be carried out to control a vehicle function of a vehicle. Method 400 for controlling may be carried out in conjunction with the system from FIG. 1 or FIG. 2. In addition, method 400 for controlling may be carried out using or with the aid of the second device from FIG. 1 or FIG. 2.

In method 400, in a step 410 of receiving, a control signal is received that is generated using a friction coefficient that is determined by carrying out the method for determining from FIG. 3 or a similar method. The vehicle function is controlled in a subsequent step 420 of controlling, using the control signal that is received in step 410 of receiving.

FIG. 5 shows a flow chart of a determination process 500 according to one exemplary embodiment. Determination process 500 may be carried out in conjunction with the method for determining from FIG. 3 or a similar method. In addition, determination process 500 may be carried out in conjunction with the system from FIG. 1 or FIG. 2, in particular in conjunction with the first device.

Sensor signals in the form of sensor data are received from vehicles or transmitted by vehicles in a block 502. Sensor signals from a roadside sensor system or from infrastructure sensors are received or transmitted in a block 504. The server device or a server interface or backend receives the sensor signals and requests weather data, for example, in a block 506. A weather service, as a surroundings sensor, provides surroundings data as sensor signals in a block 508. Data preprocessing, for example feature set adaptation, takes place in a block 510. The preprocessed data or time series data are processed to form a friction coefficient, using a regression algorithm, and friction coefficients for subsequent time increments are predicted, in a block 512. The processed data are relayed to end points, for example to at least one vehicle, in a block 514.

These data that are processed to form a friction coefficient may be utilized in the form of a control signal, for example, in order to set in particular safe curve speeds according to an instantaneously prevailing friction coefficient, for example for a vehicle for highly automated driving.

Figure 6:
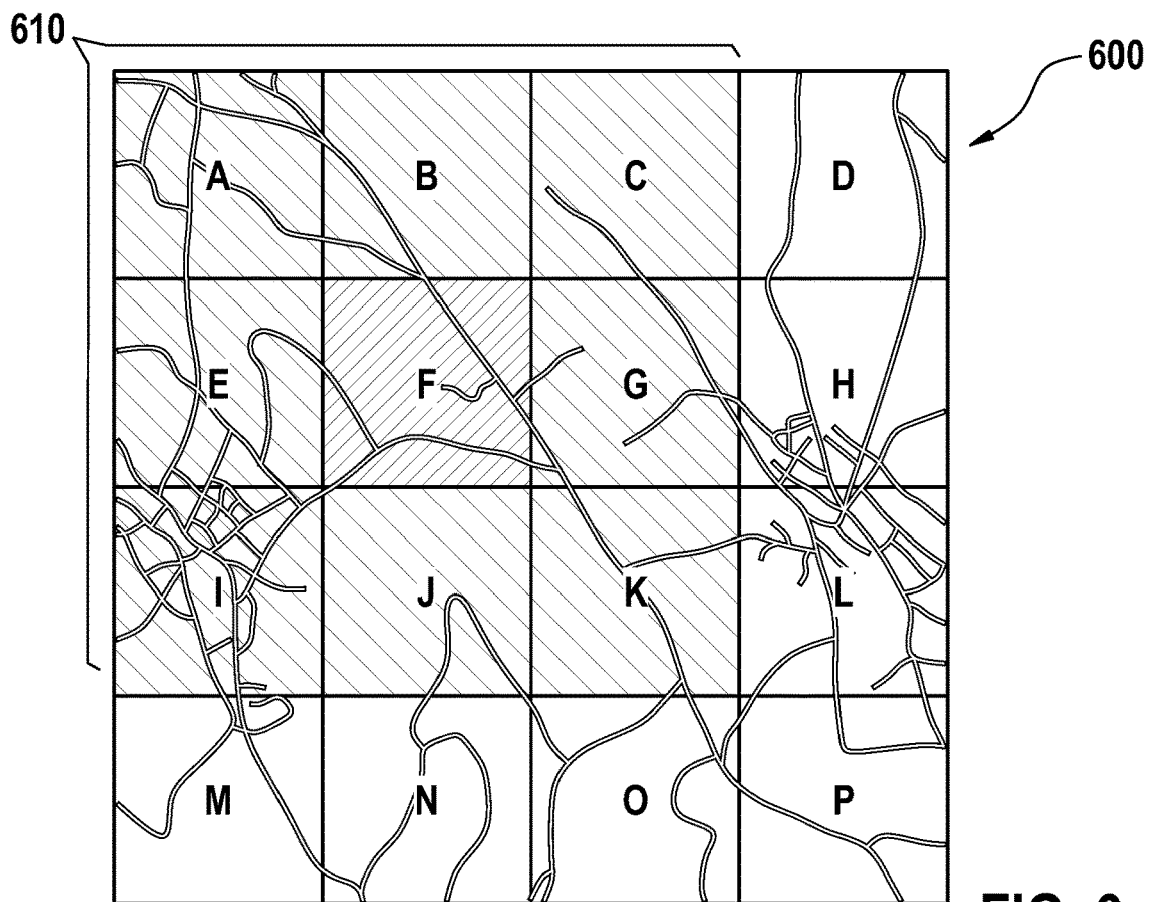
FIG. 6 shows a schematic illustration of a friction coefficient map including geographical regions according to one exemplary embodiment.

FIG. 6 shows a schematic illustration of a friction coefficient map 600 that includes geographical regions according to one exemplary embodiment. Friction coefficient map 600 includes 16 geographical regions A through P strictly by way of example. For each of geographical regions A through P of friction coefficient map 600, a friction coefficient is determined according to the method for determining from FIG. 3 or a similar method, or with the aid of the first device from FIG. 1 or FIG. 2 or a similar device.

Friction coefficient map 600 represents an approximation for spatial modeling of the friction coefficients determined as a function of location. Various approaches may be selected for this purpose. For illustration, in FIG. 6 a grid approach with square, equally sized geographical regions A through P or areas is selected. For each of these geographical regions A through P, a regression model, for example for linear regression, is used for computing the friction coefficient. For example, if the friction coefficient for geographical region F is determined, according to one exemplary embodiment, surrounding or neighboring geographical regions 610 are included in the determination. With regard to geographical region F, neighboring geographical regions 610 include in particular geographical regions A, B, C, E, G, I, J, and K. Neighboring geographical regions 610 may optionally also include more or fewer than geographical regions A, B, C, E, G, I, J, and K.

Figure 7:
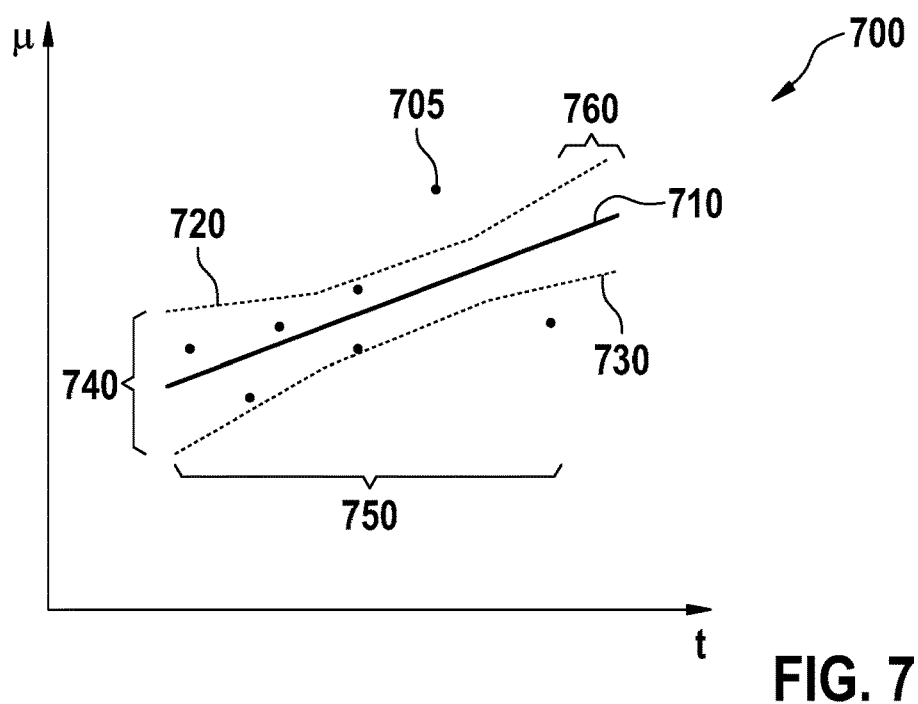
FIG. 7 shows a friction coefficient-time diagram according to one exemplary embodiment.

FIG. 7 shows a friction coefficient-time diagram 700 according to one exemplary embodiment. Time t is plotted on the abscissa axis, and friction coefficient μ is plotted on the ordinate axis. Friction coefficient-time diagram 700 illustrates a time curve of the regression polynomial, used in the method for determining from FIG. 3 or a similar method, or in the first device from FIG. 1 or FIG. 2 or a similar device, for one of the geographical regions from FIG. 6.

A regression line 710, a first graph 720, and a second graph 730 are plotted in friction coefficient-time diagram 700. Regression line 710 represents friction coefficient μ for the geographical region, which is determined from data points 705 representing state data or sensor signals. Regression line 710 is situated between first graph 720 and second graph 730. First graph 720 and second graph 730 delimit a confidence interval 740 around regression line 710. When the regression polynomial, used in the method for determining from FIG. 3 or a similar method, or in the first device from FIG. 1 or FIG. 2 or a similar device, is applied, regression line 710 is dividable, relative to the time axis, into an estimation range 750 based on data, and a prediction range 760 for prediction.

One exemplary embodiment is explained in greater detail below and in a different way with regard to the regression, with reference to the figures described above.

Friction coefficient μ may be depicted and predicted with the aid of linear regression. The regression model or regression polynomial is a linear polynomial that may be repeatedly or continuously recomputed or updated in time increments or as a function of time, in particular with the aid of the least squares method, using new and historical data, in particular with possible weighting. Thus, the time curve of friction coefficient μ may be simulated, a friction coefficient μ may be computed at a point in time as a point on regression line 710 (low-pass effect), and a friction coefficient μ in the near future may be predicted. With the aid of various plausibility checks, even quickly changing preliminary friction coefficients, which do not fit the linear regression curve or regression line 710, may be detected and a new polynomial computation may be triggered. This regression model is applied to the individual sensor input data or sensor signals 140 which have been previously converted into the preliminary friction coefficient via physical models or other models. The computed preliminary friction coefficients at a point in time are then aggregated to form a result friction coefficient or friction coefficient μ in a rule-based approach as a function of their confidence intervals, using the weighted averaging method. This friction coefficient is then used, for example, as an input value at a point in time for the regression model. The aggregated confidence interval may be interpreted as a quality level and used for weighting in the model computation.

Usable as possible input variables are state data, for example surroundings data, in particular weather data such as temperature, rain/snow, humidity, air pressure, solar radiation, etc., infrastructure data of a road sensor system, for example the temperature of the road pavement, dampness on the road surface, number of vehicles, etc., driving data, for example a determination of the utilized friction coefficient by an inertial sensor system/odometry, slip, etc., a determination of the utilized friction coefficient by a steering system, a determination of the utilizable friction coefficient by an antilock braking system (ABS) or electronic stability program (ESP) interventions, infrastructure data, for example a determination of the utilizable friction coefficient by a road sensor system, in particular the temperature of the road pavement, dampness of the road surface, number of vehicles etc., surroundings data, such as a determination of the utilizable friction coefficient based on a surroundings sensor system, for example a camera, radar, thermal imaging, LIDAR, etc., and a friction coefficient or state at surrounding locations or in surrounding geographical regions.

According to one exemplary embodiment, the aggregated result friction coefficient or friction coefficient μ once again includes a confidence interval and the instantaneously estimated friction coefficient at a location at a point in time.

According to one exemplary embodiment, for computing friction coefficient μ, a parameterized regression model containing historical, persistent data is used for each of geographical regions A, B, C, D, E, F, G, H, I, J, K, L, M, N, O, P for all available sensor system values or sensor signals 140. A friction coefficient μ may thus also be independently determined and/or predicted for each of geographical regions A, B, C, D, E, F, G, H, I, J, K, L, M, N, O, P.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for determining a friction coefficient for a contact between a tire of a vehicle and a roadway, the method comprising the following steps:
   processing sensor signals to generate processed sensor signals, the sensor signals representing at least state data that are read in by at least one detection device and that are correlatable with the friction coefficient, the processed sensor signals representing at least one preliminary friction coefficient; and
   ascertaining the friction coefficient using the processed sensor signals and a regression model,
   wherein the friction coefficient for a geographical region that includes a surrounding area is ascertained in the ascertaining step, the friction coefficient being ascertained for at least one further equally sized geographical region neighboring the geographical region, using at least one already ascertained friction coefficient, in the ascertaining step,
   wherein a plurality of regression models is used in the ascertaining step, a dedicated regression model of the plurality of regression models being used for each of a plurality of geographical regions.

2. The method as recited in claim 1, wherein, in the ascertaining step, multiple preliminary friction coefficients, in each case for one point in time, are aggregated to form the friction coefficient as a function of confidence intervals of the multiple preliminary friction coefficients and/or using weighted average values.

3. The method as recited in claim 1, wherein in the ascertaining step, the regression model is changed: (i) as a function of instantaneous preliminary coefficients and/or previous preliminary friction coefficients, and/or (ii) using a least squares method.

4. The method as recited in claim 1, wherein, in the processing step, the sensor signals represent state data read in by a surroundings sensor of at least one vehicle, and/or read in by an infrastructure sensor for a surrounding area, and/or read in by at least one driving data sensor of the vehicle, and/or that represent surroundings data for the surrounding area, and/or that represent infrastructure data for the surrounding area, and/or that represent driving data of the vehicle.

5. A method for controlling a vehicle function of a vehicle, the method comprising the following steps:
   receiving a control signal that is generated using a friction coefficient, the friction coefficient being determined by:
      processing sensor signals to generate processed sensor signals, the sensor signals representing at least state data that are read in by at least one detection device and that are correlatable with the friction coefficient, the processed sensor signals representing at least one preliminary friction coefficient, and
      ascertaining the friction coefficient using the processed sensor signals and a regression model; and
   controlling the vehicle function using the received control signal,
   wherein the friction coefficient for a geographical region that includes a surrounding area is ascertained in the ascertaining step, the friction coefficient being ascertained for at least one further equally sized geographical region neighboring the geographical region, using at least one already ascertained friction coefficient, in the ascertaining step, wherein a plurality of regression models is used in the ascertaining step, a dedicated regression model of the plurality of regression models being used for each of a plurality of geographical regions.

6. A device configured to determine a friction coefficient for a contact between a tire of a vehicle and a roadway, the device configured to:

process sensor signals to generate processed sensor signals, the sensor signals representing at least state data that are read in by at least one detection device and that are correlatable with the friction coefficient, the processed sensor signals representing at least one preliminary friction coefficient; and ascertain the friction coefficient using the processed sensor signals and a regression model, wherein the friction coefficient for a geographical region that includes a surrounding area is ascertained in the ascertaining step, the friction coefficient being ascertained for at least one further equally sized geographical region neighboring the geographical region, using at least one already ascertained friction coefficient, in the ascertaining step, wherein a plurality of regression models is used in the ascertaining step, a dedicated regression model of the plurality of regression models being used for each of a plurality of geographical regions.

7. A non-transitory machine-readable memory medium on which is stored a computer program for determining a friction coefficient for a contact between a tire of a vehicle and a roadway, the computer program, when executed by a computer, causing the computer to perform the following steps:

processing sensor signals to generate processed sensor signals, the sensor signals representing at least state data that are read in by at least one detection device and that are correlatable with the friction coefficient, the processed sensor signals representing at least one preliminary friction coefficient; and ascertaining the friction coefficient using the processed sensor signals and a regression model, wherein the friction coefficient for a geographical region that includes a surrounding area is ascertained in the ascertaining step, the friction coefficient being ascertained for at least one further equally sized geographical region neighboring the geographical region, using at least one already ascertained friction coefficient, in the ascertaining step, wherein a plurality of regression models is used in the ascertaining step, a dedicated regression model of the plurality of regression models being used for each of a plurality of geographical regions.

* * * * *